(12) United States Patent
Thompson

(10) Patent No.: US 7,028,715 B2
(45) Date of Patent: *Apr. 18, 2006

(54) HEATED DRAIN LINE APPARATUS

(75) Inventor: Alvin Dean Thompson, St. Joseph, MO (US)

(73) Assignee: DT Search & Design LLC, St. Joseph, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/974,260

(22) Filed: Oct. 27, 2004

(65) Prior Publication Data

US 2005/0139278 A1  Jun. 30, 2005

Related U.S. Application Data

(63) Continuation-in-part of application No. 10/351,063, filed on Jan. 24, 2003, now Pat. No. 6,810,916.

(51) Int. Cl.
*F16L 53/00* (2006.01)

(52) U.S. Cl. .......................... 138/32; 138/115

(58) Field of Classification Search ................. 138/32, 138/38, 112, 149; 165/136, 164, 172, 177, 165/185
See application file for complete search history.

(56) References Cited

U.S. PATENT DOCUMENTS

| | | | | |
|---|---|---|---|---|
| 2,650,801 A | * | 9/1953 | Collito | 165/164 |
| 2,778,609 A | * | 1/1957 | Peeps | 165/164 |
| 2,982,992 A | * | 5/1961 | Brown et al. | 425/87 |
| 3,151,633 A | * | 10/1964 | Shuman | 138/177 |
| 3,269,422 A | * | 8/1966 | Matthews et al. | 138/111 |
| 3,565,118 A | * | 2/1971 | Stearns | 138/112 |
| 3,834,458 A | * | 9/1974 | Bilbro et al. | 165/164 |
| 3,955,601 A | * | 5/1976 | Plummer, III | 138/149 |
| 3,972,821 A | * | 8/1976 | Weidenbenner et al. | 252/75 |
| 3,986,341 A | * | 10/1976 | DeHaan | 62/50.7 |
| 4,194,536 A | * | 3/1980 | Stine et al. | 138/149 |
| 4,867,234 A | * | 9/1989 | Herrmann | 165/177 |
| 6,810,916 B1 | * | 11/2004 | Thompson | 138/32 |

* cited by examiner

*Primary Examiner*—James Hook
(74) *Attorney, Agent, or Firm*—Shughart Thomson & Kilroy P.C

(57) ABSTRACT

A drainage device and method of decreasing clogging in a drain pipe comprising heating the drain pipe with a heating element that is partially enclosed.

27 Claims, 2 Drawing Sheets

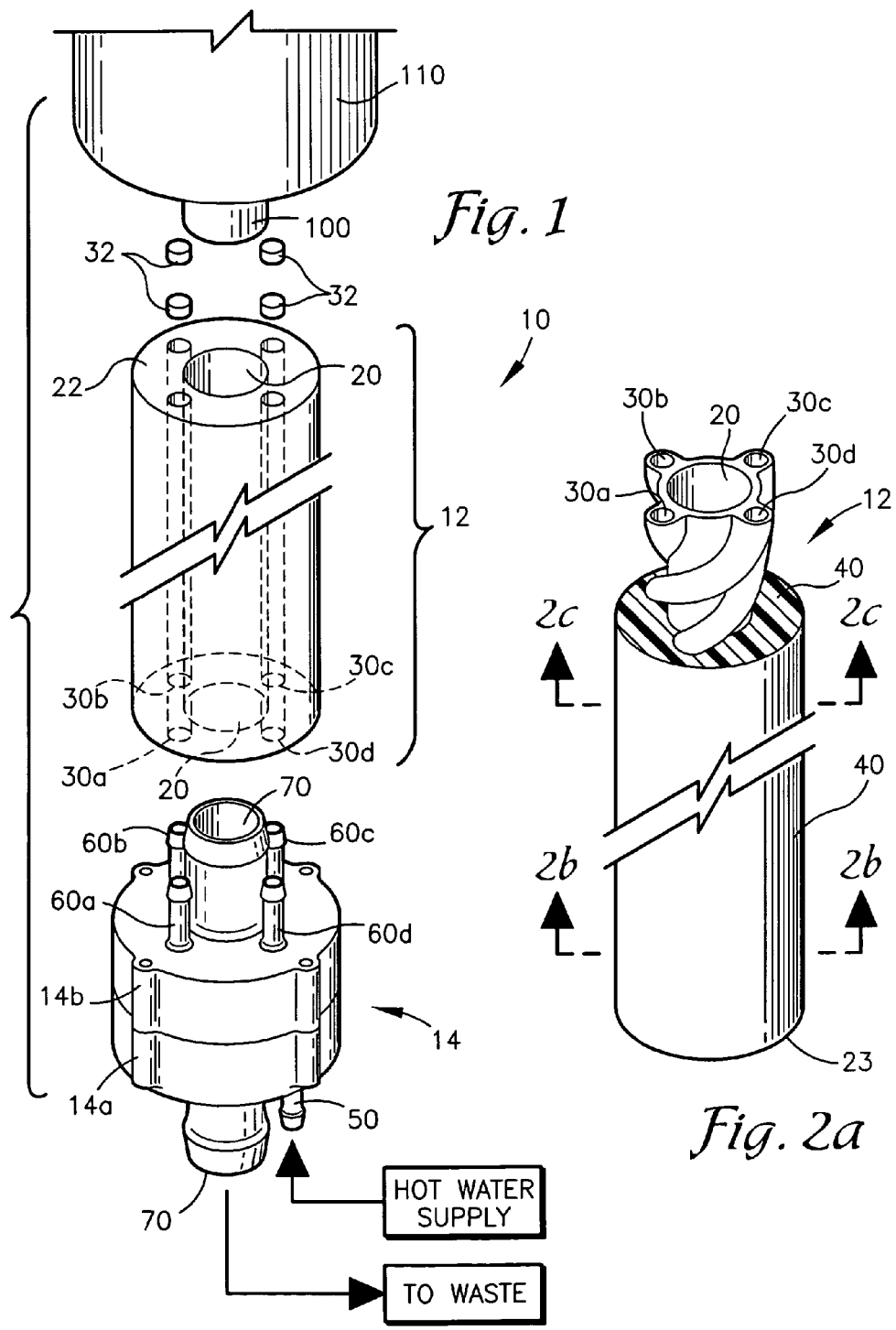

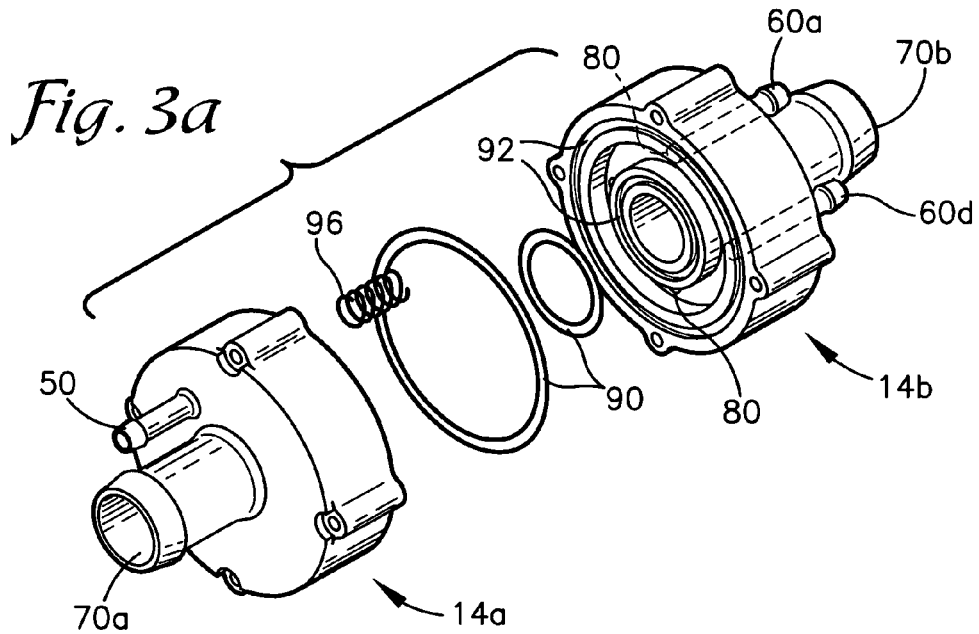
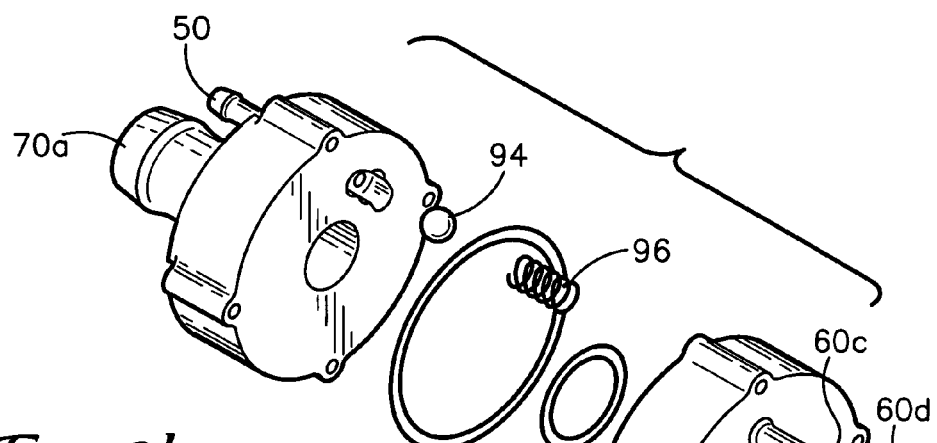
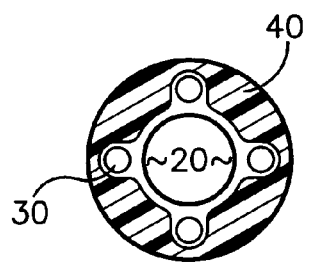
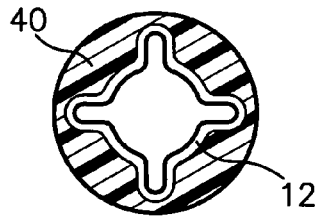

HEATED DRAIN LINE APPARATUS

CROSS REFERENCE

This application is a Continuation-in-Part of U.S. patent application Ser. No. 10/351,063 filed Jan. 24, 2003, now U.S. Pat. No. 6,810,916.

STATEMENT REGARDING FEDERALLY SPONSORED RESEARCH OR DEVELOPMENT

Not Applicable.

FIELD OF THE INVENTION

The present invention is directed to a drainage system, and in particular, to a drain apparatus that is heated in order to prevent the drain from clogging.

DESCRIPTION OF RELATED ART

Various plumbing drainage systems are used in commercial and residential settings. For example, in industrial settings such as slaughterhouses, a drain may collect liquid waste from multiple sources in the building.

Most homes have a fairly simple plumbing setup that includes hot and cold water supply lines and a drain line for the sinks, toilets, and showers. Most plumbing fixtures in the home involve a drain trap, a J-shaped piece of drain pipe designed to provide a water barrier between the home and the potential of sewer gas. The traps hold water which prevents the air-borne bacteria and odor of the sewer gas from entering the house. Each individual drain usually feeds into a larger sewage drain which is connected to the city's wastewater sewer system.

A common problem with drain lines—both industrial and residential—is that they become blocked with hair, grease, lint, food, soap scum, and other particles. Today, there are many products on the market which are used to unclog drains that have become blocked with such materials such as plungers, mechanical snakes, various chemicals, and even bacteria. These products are generally not preventative devices but merely assist the homeowner with manually unclogging the drain after a clog has arisen.

Some products on the market today supposedly help prevent clogs from occurring in the drain. These products generally involve enzymatic or chemical substances that must be manually poured down the drain on a periodic basis. Thus, the homeowner is often undesirably exposed to bacteria and/or other hazardous chemical substances when using such products. An example of a drainage system which overcomes the problems associated with the prior art is set forth in applicant's co-pending patent application Ser. No. 10/351,063, entitled HEATED DRAIN LINE APPARATUS, which is incorporated by reference in its entirety. However, there remains a need to develop alternate improved drainage systems.

BRIEF SUMMARY OF THE INVENTION

Therefore, it is an object of the present invention to provide a drainage system which helps prevent the drain from clogging or decreases the rate of such clogging.

It is another object to provide a drainage system that can be used substantially free of harmful enzymatic/chemical substances.

BRIEF DESCRIPTION OF THE DRAWINGS

FIG. 1 is an exploded view of the drainage system in accordance with the present invention.

FIG. 2A is a perspective view of an elongated tubular member used in the drainage system of the present invention with a portion of the insulation removed.

FIG. 2B is a cross-section of the elongated tubular member shown in FIG. 2A taken through line 2B—2B (without coring).

FIG. 2C is a cross-section of the elongated tubular member shown in FIG. 2A taken through line 2C—2C (with coring).

FIG. 3A is an exploded view of an adapter used in the drainage system of the present invention.

FIG. 3B is another exploded view of the adapter used in the drainage system of the present invention.

DETAILED DESCRIPTION OF PREFERRED EMBODIMENT

The drainage system of the present invention employs heat adjacent to the drain line in order to prevent grease and other unwanted substances from building up along the drain line wall and forming a clog. While the present invention can be used for both commercial and residential purposes, the drainage system of the present invention is well suited for commercial applications, especially those in the fast-food industries wherein grease and sugar often undesirably clog drain lines from sinks, soda dispensers, and the like.

FIG. 1 illustrates the drainage system 10 of the present invention used in conjunction with an existing soda fountain drain pan or basin 110 and drain port 100. The drain port 100 is typically comprised of, for example, hard plastic (e.g., PVC, ABS), copper, stainless steel, brass, and the like. Typically, the drain line port extends about 0.5 to 12 inches below the drain pan/basin 110.

As shown in FIG. 1, the drainage system 10 of the present invention includes an elongated tubular member 12, which is coupled to the drain port 100, and an adapter 14, which is coupled to a hot water source. As discussed in more detail below, hot water flowing through the drainage system 10 helps prevent clogs in the system without the need to use enzymatic/chemical substances.

The elongated tubular member 12 includes both a center drain line 20 for receiving waste or drain liquid from the drain port 100 and one or more outer hot water supply lines 30a, 30b, 30c, 30d for receiving hot water from a hot water source. The center drain line 20 and hot water supply lines 30a–d are preferably manufactured as a single unit comprised of rubber, plastic, nylon, and the like. It will be appreciated, however, that the center drain line 20 and hot water supply lines 30a–d may be separately fabricated as individual units.

FIG. 2A shows a first embodiment of the elongated tubular member 12 of the present invention in more detail. The hot water supply lines 30a–d are preferably coiled or snaked around the center drain line 20. As such, the heat from the hot water in the hot water supply lines 30a–d is substantially evenly transferred to the center drain line 20. This heat helps soften or loosen the grease and syrup/sugar in the line 20. The tubular member 12 may also include insulation 40 wrapped around at least a portion of one or more of the water supply lines 30a–d. The insulation is preferably comprised of foam and/or other materials. The insulation 40 helps prevent heat from being dissipated to the surrounding environment as hot water travels through the system.

The elongated tubular member 12 is preferably manufactured as a long continuous unit, typically 1 to 100 feet long, and more preferably about 10 to 25 feet long. The elongated tubular member 12 is then cut to the desired size prior to installation.

The center drain line 20 of the elongated tubular member 12 is coupled to the drain port 100 in any suitable manner well known to those skilled in the art. In the preferred embodiment, the drain port 100 of the basin 110 is placed inside the center drain line 20 of the elongated tubular member 12. A tight seal between the drain port 100 and center drain line 20 may be obtained using epoxy, hose clamps, tie wraps, and the like. It will be appreciated that the center drain line 20 may be any suitable diameter, depending on the size of the drain port 100 fitted to the drainage system so that a tight fit is obtained. The center drain line 20 is preferably manufactured with a diameter of about 0.25 to 0.6 inches, and even more preferably about 0.4 to 0.6 inches, and most preferably about 0.5 inches.

Prior to installation, two modifications are made to the elongated tubular member 12. First, before coupling the elongated tubular member 12 to the drain port 100, a portion near the first end 22 of the elongated tubular member 12 is removed so that the hot water supply lines 30*a–d* are connected to the center supply tube 20. To remove this material, a coring device is placed in the center of the center drain line 20 and then actuated. A cross-section of the elongated tubular member 12 without and with coring is illustrated in FIGS. 2B and 2C, respectively. The elongated tubular member 12 is typically cored about 0.5 to 12 inches, and more preferably about 2–3 inches from the end of the elongated tubular member 12. About 0.5 to 6 inches, preferably about 1 to 3 inches of material, is removed from the tubular member 12 lengthwise. The material may be removed using any suitable tool, such as a knife or file or coring tool that can reach down into tubular member 12 and cut it away to provide access to hot water supply lines 30*a–d*.

Prior to use, the hot water supply lines 30*a–d* at the first end 22 of the elongated tubular member 12 are plugged or filled with a suitable material so that the hot water does not exit the elongated tubular member 12 at the first end 22 but instead travels up through the hot water supply lines 30*a–d* to the center drain line 20 where the material has been cored away as discussed above. Suitable plug 32 materials include rubber, plastic, nylon, PVC and the like.

The hot water supply lines 30*a–d* may be any suitable size. The hot water supply lines preferably have a diameter of about 0.05 to 3 inches, and even more preferably, about 0.1 to 0.50 inches, and most preferably about 0.15 inches.

A second end 23 of the elongated tubular member 12 is coupled to an adapter 14, which is connected by pipes or tubing to a hot water source (not shown). The adapter 14 includes at least one inlet port 50 for receiving the hot water and at least one outlet port 60*a–d* for transferring the hot water to the one or more hot water supply lines 30*a–d* in elongated tubular member 12 of the drainage system 10. The adapter 14 also includes a center orifice 70 for receiving waste/drain water from the center drain line 20.

A preferred adapter is illustrated in FIGS. 3A and 3B. The adapter 14 includes a lower inlet half 14*a* having the inlet port 50 and lower center orifice 70*a*. The adapter also includes an upper outlet half 14*b* having one or more outlet ports 60*a–d* connected to a circumferential channel 80 and an upper center orifice 70*b*. The lower inlet half and upper outlet half are fastened together by one or more pan head screws. O-rings 90 and O-ring grooves 92 in either or both of the adapter halves 14*a*, 14*b* are used to provide a tight seal between the lower center orifice 70*a* and upper center orifice 70*b*, as well as between the channel 80 and the lower inlet half 14*a*.

During use, as hot water from a hot water supply enters the inlet port 50 under pressure, it travels to the circumferential channel 80 and out of the one or more outlet ports 60*a–d*. The inlet half 14*a* includes a check valve ball 94 and spring 96 to prevent water from flowing back into the inlet port 50. The hot water travels from the outlet ports 60*a–d* through the hot water supply lines 30*a–d*, to the cored-out area to the center drain line 20. As such, the water heats any material in the center drain line 20. In addition, as the hot water enters the center drain line 20 and travels downward with the waste liquid, it flushes any material present therein through the center drain line 20, through the upper and lower center orifices 70*a–b* of the adapter 12, and to the sewage/waste receiving area. This heat prevents the grease, hair, and other debris from settling along the drainage system. In addition, the rate at which the drain line becomes clogged is decreased.

The hot water flowing through the system 10 may be actuated using any suitable means well known to those skilled in the art. For example, hot water may travel through the drainage system by manually turning a valve. Alternately, when the system reaches a certain temperature, a thermocouple may signal that the system should be heated. As another alternative, a timer may be used for periodic flushing of the system.

Those skilled in the art will recognize that other types of elongated tubular members and adapters can be used in conjunction with the present invention. For example, the number, location, and orientation (linear vs. coiled) of the hot water supply lines 30*a–d* can vary depending on the amount and type of fluid that is running through the drain line and the amount and type of waste material running through the drain line.

While specific embodiments have been shown and discussed, various modifications may, of course, be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A drainage system comprising:
   (a) a center drain line for receiving waste liquid;
   (b) one or more outer hot water supply lines for receiving hot water and heating said center drain line;
   (c) said center drain line and said hot water supply lines being comprised of a single elongated tubular member;
   (d) each of the hot water supply lines of the elongated tubular member being plugged at an end; and
   (e) each of said hot water supply lines communicating with said center drain line to enable flow of said hot water through said hot water supply lines and into said center drain line.

2. The drainage system of claim 1 wherein said elongated tubular member is comprised of a material selected from one or more of the group consisting of rubber, plastic, and nylon.

3. The drainage system of claim 1 wherein a portion of the elongated tubular member is removed so that at least one hot water supply line is directly connected to the center drain line.

4. The drainage system of claim 1 wherein insulation surrounds at least a portion of one or more of said outer hot water supply lines.

5. The drainage system of claim 1 where there are four hot water supply lines.

6. The drainage system of claim 1 wherein said one or more hot water supply lines are coiled around said center drain line.

7. The drainage system of claim 1 wherein said one or more hot water supply lines are positioned so that heat is substantially evenly transferred to the center drain line as water moves through the water supply lines.

8. The drainage system of claim 1 further comprising an adapter coupled to said one or more outer hot water supply lines, said adapter also connected to a hot water source.

9. The drainage system of claim 8 wherein said adapter comprises at least one inlet port for receiving hot water and at least one outlet port for transferring the hot water to the one or more hot water supply lines.

10. The drainage system of claim 8 wherein said adapter also includes a center orifice for receiving waste liquid, and wherein said center orifice is coupled to said center drain line.

11. The drainage system of claim 8 wherein said adapter comprises a lower inlet half having the inlet port and lower center orifice, and said adapter also comprises an upper outlet half having one or more outlet ports connected to a circumferential channel and an upper center orifice.

12. A drainage system comprising:
(a) a center drain line for receiving waste liquid;
(b) one or more outer hot water supply lines for receiving hot water and heating said center drain line;
(c) said center drain line and said hot water supply lines being comprised of a single elongated tubular member; and
(d) at least one of the hot water supply lines of the elongated tubular member being plugged at an end.

13. A drainage system comprising:
(a) a center drain line for receiving waste liquid;
(b) one or more outer hot water supply lines for receiving hot water and heating said center drain line;
(c) an adapter coupled to said one or more outer hot water supply lines, said adapter also connected to a hot water source;
(d) said adapter comprising a lower inlet half having an inlet port and a lower center orifice, and said adapter also comprising an upper outlet half having one or more outlet ports connected to a circumferential channel and an upper center orifice; and
(e) said lower inlet half including a check valve ball and spring to prevent water from flowing back into the inlet port.

14. A method for decreasing the rate at which a drain pipe is clogged, said method comprising the steps of:
(a) providing a drain line;
(b) heating at least a portion of said drain line with a heating element comprised of hot water enclosed in a hot water supply line adapted to receive the hot water; and
(c) said hot water first flowing through said hot water supply line and subsequently flowing through said drain line.

15. The method of claim 14 wherein said drain line and said hot water supply line are comprised of a single elongated tubular member.

16. The method of claim 15 wherein said elongated tubular member is comprised of a material selected from one or more of the group consisting of rubber, plastic, and nylon.

17. The method of claim 15 wherein a portion of an end of the elongated tubular member is removed so that said hot water supply line is directly connected to the drain line.

18. The method of claim 14 wherein insulation surrounds at least a portion of said hot water supply line.

19. The method of claim 14 where there are four hot water supply lines.

20. The method of claim 14 wherein said hot water supply line is coiled around said drain line.

21. The method of claim 14 wherein said hot water supply line is positioned so that heat is substantially evenly transferred to the center drain line as water moves through the water supply lines.

22. The method of claim 14 further comprising the step of providing an adapter coupled to said hot water supply lines, said adapter also connected to a hot water source.

23. The method of claim 22 wherein said adapter comprises at least one inlet port for receiving hot water and at least one outlet port for transferring the hot water to hot water supply line.

24. The method of claim 22 wherein said adapter also includes a center orifice for receiving waste liquid, and wherein said center orifice is coupled to said drain line.

25. The method of claim 22 wherein said adapter comprises a lower inlet half having the inlet port and lower center orifice, and said adapter also comprises an upper outlet half having one or more outlet ports connected to a circumferential channel and an upper center orifice.

26. A method for decreasing the rate at which a drain pipe is clogged, said method comprising:
(a) providing a drain line;
(b) heating at least a portion of said drain line with a heating element comprised of hot water enclosed in a hot water supply line adapted to receive the hot water;
(c) said drain line and said hot water supply line being comprised of a single elongated tubular member; and
(d) the hot water supply line of the elongated tubular member being plugged at an end.

27. A method for decreasing the rate at which a drain pipe is clogged, said method comprising the steps of:
(a) providing a drain line;
(b) heating at least a portion of said drain line with a heating element comprised of hot water enclosed in a hot water supply line adapted to receive the hot water;
(c) providing an adapter coupled to said hot water supply lines, said adapter also connected to a hot water source;
(d) said adapter comprising a lower inlet half having an inlet port and a lower center orifice, and said adapter also comprising an upper outlet half having one or more outlet ports connected to a circumferential channel and an upper center orifice; and
(e) said lower inlet half including a check valve ball and spring to prevent water from flowing back into the inlet port.

* * * * *